US012783926B2

(12) United States Patent
Neill et al.

(10) Patent No.: US 12,783,926 B2
(45) Date of Patent: Nov. 3, 2026

(54) GLOBAL FLUX BIAS

(71) Applicant: Google LLC, Mountain View, CA (US)

(72) Inventors: Charles Neill, Goleta, CA (US); Anthony Edward Megrant, Goleta, CA (US)

(73) Assignee: Google LLC, Mountain View, CA (US)

( * ) Notice: Subject to any disclaimer, the term of this patent is extended or adjusted under 35 U.S.C. 154(b) by 234 days.

(21) Appl. No.: 17/612,151

(22) PCT Filed: May 15, 2020

(86) PCT No.: PCT/US2020/033129
§ 371 (c)(1),
(2) Date: Nov. 17, 2021

(87) PCT Pub. No.: WO2020/236587
PCT Pub. Date: Nov. 26, 2020

(65) Prior Publication Data

US 2022/0215283 A1 Jul. 7, 2022

Related U.S. Application Data

(60) Provisional application No. 62/849,781, filed on May 17, 2019.

(51) Int. Cl.
*G06N 10/40* (2022.01)
*G06F 15/82* (2006.01)

(52) U.S. Cl.
CPC ............. *G06N 10/40* (2022.01); *G06F 15/82* (2013.01)

(58) Field of Classification Search
CPC ......... G06F 15/82; G06N 10/40; G06N 10/00
USPC ............................................................ 712/25
See application file for complete search history.

(56) References Cited

U.S. PATENT DOCUMENTS

| | | | | | |
|---|---|---|---|---|---|
| 10,352,992 | B1 * | 7/2019 | Zeng | G06N 10/00 |
| 11,112,842 | B1 * | 9/2021 | Smith | G06N 10/00 |
| 2005/0224784 | A1 * | 10/2005 | Amin | G06N 10/00 257/14 |
| 2018/0054201 | A1 * | 2/2018 | Reagor | G06N 10/20 |
| 2018/0330264 | A1 * | 11/2018 | Lanting | G06N 10/00 |

(Continued)

FOREIGN PATENT DOCUMENTS

| | | |
|---|---|---|
| WO | WO 2013/006375 | 1/2013 |
| WO | WO 2018/035448 | 2/2018 |

OTHER PUBLICATIONS

Office Action in Canadian Appln. No. 3,140,970, dated Feb. 17, 2023, 3 pages.

(Continued)

*Primary Examiner* — Chun Kuan Lee
(74) *Attorney, Agent, or Firm* — Fish & Richardson P.C.

(57) ABSTRACT

A method is presented, including providing an offset magnetic flux bias to a plurality of superconducting qubits and providing respective control magnetic flux biases, for performing a computation, to the plurality of qubits using a plurality of control lines coupled respectively to each qubit. The qubits are configured such that respective resonance frequencies of the qubits are controlled by the offset magnetic flux bias and the respective control magnetic flux biases. The qubits are arranged to perform the computation when the respective resonance frequencies of the qubits are within an operational dynamic range.

19 Claims, 9 Drawing Sheets

(56) References Cited

U.S. PATENT DOCUMENTS

| | | | | |
|---|---|---|---|---|
| 2020/0167683 | A1* | 5/2020 | Frisch .................... | H10N 69/00 |
| 2020/0167684 | A1* | 5/2020 | Frisch .................... | G06N 10/40 |
| 2020/0279186 | A1* | 9/2020 | Ferguson ............... | B82Y 10/00 |

OTHER PUBLICATIONS

Chen et al., "Qubit Architecture with High Coherence and Fast Tunable Coupling," Phys. Rev. Lett., Nov. 2014, 113(22):220502.
Foxen et al., "High speed flux sampling for tunable superconducting qubits with an embedded cryogenic transducer," Superconductor Science and Technology, Dec. 2018, 32(1):15012.
International Preliminary Report on Patentability in International Appln. No. PCT/US2020/033129, dated Nov. 16, 2021, 15 pages.
International Search Report and Written Opinion in International Appln. No. PCT/US2020/033129, dated Sep. 3, 2020, 18 pages.
Office Action in Chinese Appln. No. 202080036776.2, mailed on Mar. 26, 2024, 21 pages (with English translation).
Office Action in Canadian Appln. No. 3,140,970, mailed on Aug. 23, 2024, 3 pages.
Osborn et al., "Frequency-Tunable Josephson Junction Resonator for Quantum Computing" IEEE Transactions on Applied Superconductivity vol. 17, No. 2, Jun. 2007, 166-168.
Office Action in European Appln. No. 20732011.0, mailed on Jul. 18, 2025, 12 pages.
Office Action in Canadian Appln. No. 3,140,970, mailed on Jul. 22, 2025, 5 pages.

* cited by examiner

GLOBAL FLUX BIAS

CROSS-REFERENCE TO RELATED APPLICATIONS

This application is a National Stage Application under 35 U.S.C. § 371 and claims the benefit of International Application No. PCT/US2020/033129, filed on May 15, 2020, which claims priority to U.S. Provisional Application Ser. No. 62/849,781, filed on May 17, 2019. The disclosure of the prior applications are considered part of and are incorporated by reference in the disclosure of this application.

TECHNICAL FIELD

This present subject matter relates to control of qubits.

BACKGROUND

Large-scale quantum computers have the potential to provide fast solutions to certain classes of difficult problems. Multiple challenges in the design and implementation of quantum architecture to control, program and maintain quantum hardware impede the realization of large-scale quantum computing.

SUMMARY

The present disclosure describes technologies for implementing a qubit control cable and an attenuator as part of the cable.

In general, one innovative aspect of the subject matter of the present disclosure may be embodied in methods that include: providing an offset magnetic flux bias to a plurality of superconducting qubits; and providing respective control magnetic flux biases, for performing a computation, to the plurality of qubits using a plurality of control lines coupled respectively to each qubit. The qubits are configured such that respective resonance frequencies of the qubits are controlled by the offset magnetic flux bias and the respective control magnetic flux biases. The qubits are arranged to perform the computation when the respective resonance frequencies of the qubits are within an operational dynamic range.

The foregoing and other implementations can each optionally include one or more of the following features, alone or in combination.

In some implementations, providing the offset magnetic flux bias comprises setting the resonance frequencies of all of the qubits at a frequency within the operational dynamic range.

In some implementations, the method further includes: identifying a first group of qubits, in which the resonance frequency of each of the qubits is not controllable; and identifying a second group of qubits, in which the resonance frequency of each of the qubits is controllable. Providing the offset magnetic flux bias includes: setting the offset magnetic flux bias such that the resonance frequencies of the qubits of the first group of qubits and the second group of qubits are outside the operational dynamic range when the control magnetic flux biases are not provided. Providing the control magnetic flux biases further includes: setting the control magnetic flux biases for the second group of qubits such that the resonance frequencies of the second group of qubits are within the operational dynamic range when the offset magnetic flux bias is provided.

In some implementations, providing the offset magnetic flux bias is by providing a global magnetic field.

In some implementations, the global magnetic field is generated by driving a current through a coil. The coil is arranged such that the magnitude of the global magnetic field is substantially uniform to the plurality of qubits.

In some implementations, the coil is wound around the plurality of qubits such that the plurality of qubits are exposed to the global magnetic field through an axis of the coil.

In some implementations, the coil is disposed on a substrate on which the plurality of qubits are disposed.

In some implementations, providing the offset magnetic flux bias includes, in the following sequence: arranging a temperature around the plurality of qubits to be above the superconducting transition temperature; providing the global magnetic field; lowering the temperature below the superconducting transition temperature; and turning off the global magnetic field, such that the offset magnetic flux bias is conserved within all of the plurality of qubits after turning off the global magnetic field.

In some implementations, the operational dynamic range comprises one or more frequency ranges which fall between 4 GHz and 6 GHz.

In some implementations, each of the plurality of qubits comprises a DC SQUID.

In some implementations, each of the plurality of qubits further comprises a parallel LC circuit. An inductor of the parallel LC circuit comprises the DC SQUID. An inductance of the DC SQUID is determined by the offset flux bias and the control flux bias provided to the qubit.

In some implementations, an operation bandwidth of the offset magnetic flux is below 10 Hz, an operation bandwidth of a control magnetic flux bias is 300 to 700 MHz.

Another innovative aspect of the subject matter of the present disclosure may be embodied in an apparatus for providing an offset magnetic flux bias for a plurality of superconducting qubits that includes: an offset magnetic flux bias generator arranged to generate an offset magnetic flux bias to the plurality of qubits. The plurality of qubits are configured such that respective resonance frequencies of the qubits are controlled by the offset magnetic flux bias.

The foregoing and other implementations can each optionally include one or more of the following features, alone or in combination.

In some implementations, the offset magnetic flux bias generator further includes: a driving circuit; and a transducer.

In some implementations, the transducer includes: a coil; and a plurality of control lines coupled respective to each qubit.

In some implementations, the driving circuit is arranged to drive the coil to provide the offset magnetic flux bias.

In some implementations, the coil is wound around the plurality of qubits, the coil arranged to generate a global magnetic field which is substantially uniform for the plurality of qubits.

In some implementations, the coil is wound around the plurality of qubits such that the plurality of qubits are exposed to the global magnetic field through an axis of the coil.

In some implementations, the coil is disposed on a substrate on which the plurality of qubits are disposed.

In some implementations, the driving circuit is arranged to drive the plurality of control lines to provide the offset magnetic flux bias.

By providing an offset magnetic flux bias, or a global magnetic flux bias, to all of the qubits using a single transducer, the level of noise transmitted through the respective Z control lines and the heat generated by the Z control lines within a cryostat may be reduced.

The magnetic flux bias may be provided in the form of persistent currents within the qubits, which removes the necessity of constantly providing current. This may further reduce the heat load and suppress decoherence of qubits arising from the fluctuation of the magnetic flux bias.

The offset magnetic flux bias may be used to selectively decouple any faulty qubits from an array of qubits. Therefore, generating the offset magnetic flux bias may minimize the number of qubits excluded from the computation.

The details of one or more embodiments of the invention are set forth in the accompanying drawings and the description below. Other features, objects, and advantages of the invention will be apparent from the description and drawings, and from the claims.

DETAILED DESCRIPTION

Quantum computing entails coherently processing quantum information stored in the quantum bits (qubits) of a quantum computer. Superconducting quantum computing is a promising implementation of solid-state quantum computing technology in which quantum information processing systems are formed, in part, from superconducting materials. To operate quantum information processing systems that employ solid-state quantum computing technology, such as superconducting qubits, the systems are maintained at extremely low temperatures, e.g., in the 10 s of mK. The extreme cooling of the systems keeps superconducting materials below their critical temperature and helps avoid unwanted state transitions. To maintain such low temperatures, the quantum information processing systems may be operated within a cryostat, such as a dilution refrigerator.

In some implementations, control signals are generated in higher-temperature environments, and are transmitted to the quantum information processing system using shielded impedance-controlled GHz capable transmission lines, such as coaxial cables. The cryostat may step down from room-temperature (e.g., about 300 K) to the operating temperature of the qubits in one or more intermediate cooling stages. For instance, the cryostat may employ a stage maintained at a temperature range that is colder than room temperature stage by one or two orders of magnitude, e.g., about 30-40 K or about 3-4 K, and warmer than the operating temperature for the qubits (e.g., about 10 mK or less).

Even at the extremely low qubit operating temperatures, qubits may still suffer from decoherence and gate errors. As such, large-scale quantum error correction algorithms can be deployed to compensate for the gate errors and qubit decoherence. An error-corrected quantum processor leverages redundancy to synthesize protected logical qubits from ensembles of error-prone qubits.

Implementations of current superconducting quantum systems therefore may use a large number of qubits to implement error correction algorithms. At least one room-temperature co-axial cable per qubit is used to provide the qubit control signal. As the number of qubits increases, the thermal dissipation arising from the current level of the control signals also increases, which may raise an issue in view of a limited cooling capability of a cryostat. Furthermore, if any of the cables fail, the corresponding qubit can no longer be controlled. Furthermore, since a qubit is often coupled to one or more neighboring qubits, those neighboring qubits may have to be excluded from the computational system. For example, in a 2-dimensional grid of qubits, as many as 5 qubits may have to be excluded if one of the cables is found to be faulty.

This application relates to addressing these problems by providing a global flux bias to a group of qubits simultaneously.

Figure 1:
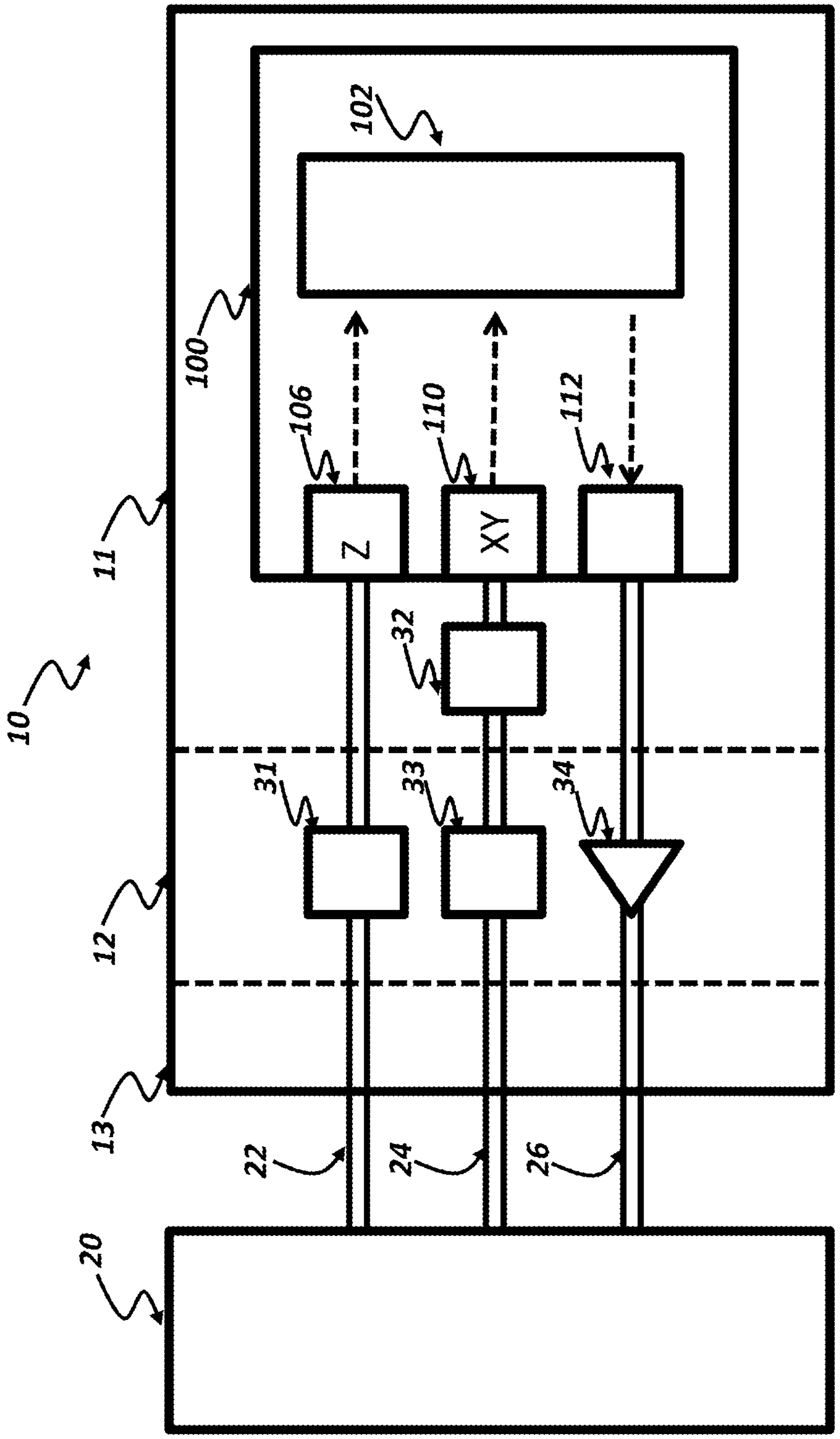
FIG. 1 is a schematic that illustrates an exemplary quantum computing system.

FIG. 1 illustrates a schematic of an exemplary quantum computing system. The quantum computing system includes a qubit chip 100 coupled to qubit control electronics 20. The qubit chip 100 includes one or more qubits 102, such as superconducting qubits, and may be operated using a final stage 11 of a cryostat 10 at extremely low temperatures (e.g., at around 10 mK or less, subject to the minimum possible temperature achievable by the cryostat, generally below 100 mK for a dilution refrigerator as the cryostat 10). The qubit control electronics 20 may be placed outside the cryostat 10, which may be at ambient condition. Alternatively, all or part of the qubit control electronics 20 may be placed in one of the stages of the cryostat 10, which will be discussed below to mitigate thermal dissipation of the qubit control electronics 20.

For the purposes of this disclosure, the qubits operated by the qubit control electronics 20 are assumed to be frequency tunable transmon (FT-XMON) qubits. A specific ratio of junction critical current of the SQUID and capacitance may be met to be in the transmon regime. Other designs are possible. For example, a ratio of junction critical current of the SQUID and capacitance not in the transmon regime may be chosen. However, the concept of this application applies to any design of qubits in which the transition frequencies are controlled by providing magnetic flux. However, the qubit control electronics 20 described herein are not limited to working with transmon qubits and may also be used with other qubit configurations, such as fluxmon qubits or gmon qubits, among others.

The cryostat 10 may be a dilution refrigerator. However, as long as the cryostat 10 can provide a sufficiently low temperature for the coherence of the qubits 102, the exact type of the cryostat 10 is not limited to a dilution refrigerator. The final stage 11 of the cryostat 10 provides a lowest possible temperature the cryostat 10 is capable of providing. For example, in case the cryostat 10 is a dilution refrigerator, the final stage 11 may be a part of the cryostat that is in thermal equilibrium with the mixing chamber of the dilution refrigerator, which usually provides a temperature around 10 mK. Also in case the cryostat 10 is a dilution refrigerator, an intermediate stage 12 of the cryostat 10 may be a part of the cryostat that is in thermal equilibrium with a chamber including liquid Helium (He4) cooled to below room temperature but above the qubit operating temperature, e.g., at around 3-4K or in thermal equilibrium with a pulse-tube cooler. The final stage 11 and the intermediate stage 12 of the cryostat 10 may be thermally enclosed within an initial stage 13 of the cryostat 10. The initial stage 13 may include parts of the cryostat 10 which provides an initial shielding from the room temperature condition. The initial shielding may include a vacuum shield or a liquid nitrogen shield and the rest of the components of the cryostat 10 such as vacuum systems and thermal shielding layers. This description of the cryostat 10 refers mainly to the common design of a dilution refrigerator. However, as discussed, the requirement from the cryostat is that it provides a sufficiently low temperature for the qubits to maintain a coherence time required for the operation. Therefore, the details of the design of the cryostat 10 may differ, such as the exact number of the stages, depending on the type of the cryostat 10 used. For example, the intermediate stage 12 temperature may be achieved with a pulse tube cooler.

Regardless of the type of the cryostat 10, the temperature gradient from the room temperature to the temperature at which the qubits 102 operate often raises considerable challenge in connecting the qubit control electronics 20 and the qubit chip 100. For brevity of the description, in the rest of the specification the cryostat 10 will be assumed to be a dilution refrigerator with the first stage 13, the intermediate stage 12, and the final stage 11.

Each qubit 102 of the qubit chip 100 may be coupled to a Z drive qubit circuit element 106 (e.g., a resonator or an inductor), an XY drive qubit circuit element 110 (e.g., a capacitor), and a qubit readout resonator 112. The qubits 102 and associated circuit elements formed on the qubit chip 100 can be formed from patterned superconductor materials on a dielectric substrate (e.g., aluminum on a silicon or sapphire substrate).

The qubit chip 100 is coupled to the qubit control electronics 20, which are operated outside the cryostat 10, for example at room temperature (e.g., about 300 K). Data lines 22, 24, 26 that connect the control electronics 20 to the qubit chip 100 may pass through one or more low temperature stages of the cryostat 10, namely through the initial stage 13, the intermediate stage 12 and the final stage 11.

The data lines 22, 24, 26 may comprise at least one qubit Z control line 22, at least one qubit XY control line 24, and at least one qubit readout line 26.

Microwave gate operations on qubits 102 can be carried out by generating an XY control signal at the control electronics 20 and then applying the XY control signal, when the qubit is operating at its resonant frequency, to the XY drive qubit circuit element 110, resulting in a deterministic rotation of the qubit state about an axis in the XY plane of the Bloch sphere, where the axis and angle of rotation are determined by the carrier phase and integrated envelope amplitude of the microwave signal, respectively. Exemplary pulse durations and envelope amplitudes, referenced to the XY-drive qubit circuit element 110, are 10-30 ns and 10-100 μV, respectively.

The control of the non-linearity of the qubit 102, therefore the tuning of the transition frequency of the qubit, can be carried out by generating a Z control signal at the control electronics 20 and then applying the Z control signal to the Z drive qubit circuit element 106.

Gate operations on qubits 102 may involve a combination of one or more of Z control signals and one or more of XY control signals.

In case there are a plurality of qubits 102, a plurality of qubit Z control lines 22 may be provided to control the transition frequencies of the respective qubits 102 individually.

The qubit control electronics 20 may include standard control circuits operating at room temperature use high-speed (~1 GSPS or higher) and high-resolution (~14-bit) digital to analog converter (DAC) waveform generators to generate each qubit XY control signal and Z control signal.

FIG. 1 also shows an exemplary arrangement of electronics components disposed within the cryostat 10 necessary for transmitting signals to control the qubits 102.

The data lines 22, 24, 26 may include a first attenuator 31, a second attenuator 32, and a third attenuator 33 and an amplifier 34. The first attenuator 31 may be disposed on the qubit Z-control line 22 in the intermediate stage 12. The third attenuator 33 may be disposed on the qubit XY-control line 24 in the intermediate stage 12. These attenuators are to suppress the noise from the qubit control electronics 20 disposed at room temperature (around 300K). In particular, 300K thermal noise (Johnson-Nyquist noise), generated from using resistance at room temperature and transmitted through the qubit Z-control line 22 and the qubit XY-control line 24, is attenuated.

The attenuators 31, 32, 33 may provide 20 dB attenuation or more. However, the exact degree of attenuation may depend on the exact parameters of the hardware.

The amplifier 34 may be disposed on the qubit readout line 26 in the intermediate stage 12, to amplify the readout signal from the qubit chip 100.

For the qubit Z control line 22, placing another attenuator in the final stage 11 may often not be feasible because the power of the signal required for Z control is typically mW level. Placing an attenuator to produce this level of power at the final stage 11 may generate heat comparable to or over the cooling capacity of the final stage 11 of a dilution fridge. Therefore, further attenuation may be provided for the qubit Z control line 22 near the qubit control electronics 20 outside the cryostat 10. The qubit 102 is a non-linear resonator with a resonance frequency in the microwave regime. For the case of a frequency tunable transmon (FT-XMON) qubit, the qubit 102 includes a capacitor in parallel with a pair of Josephson Junctions wired in a loop to form a SQUID whose effective inductance can be tuned by threading the loop with an external magnetic flux drive (e.g., provided by the qubit Z control line 22).

Figure 2:
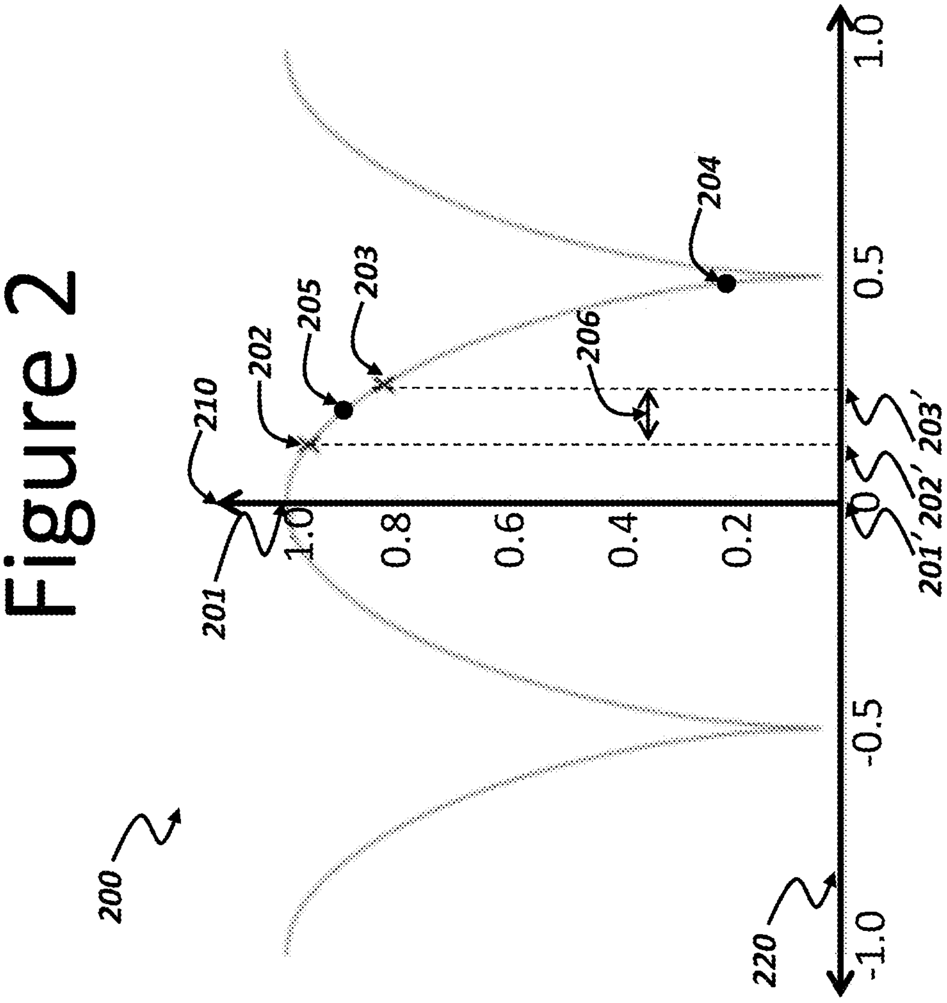
FIG. 2 is a plot that illustrates a transition frequency of a superconducting as a function of magnetic flux applied to the qubit.

FIG. 2 shows a plot 200 that illustrates a resonance frequency of a qubit 102 as a function of magnetic flux applied to the qubit 102 with references to FIG. 1.

A vertical axis 210 of the plot 200 represents a normalized transition frequency, or a normalized resonance frequency of a qubit 102. The scale of the vertical axis 210, 0 to 1, will be discussed in more detail later. A horizontal axis 220 of the plot 200 represents the magnetic flux through a SQUID loop of the qubit 102 normalized to the magnetic flux quantum, as will be explained in more detail below.

Each qubit 102 includes at least one Josephson junction. Each Josephson junction may be arranged to act as a variable inductance controlled with magnetic field. The inductance of the Josephson junction, so-called Josephson inductance, is known to be dependent on the phase difference across the junction and be proportional to the critical current of the Josephson junction. Assuming a fixed critical current, Josephson inductance is proportional to inverse cosine of the phase across the Josephson junction.

$$L \sim \frac{1}{\cos\left(\frac{\pi\varphi}{\varphi_0}\right)}$$

φ represents the magnetic flux through the DC SQUID of each qubit 102. $\varphi_0$ represents the magnetic flux quantum. Therefore, the Josephson inductance varies as a function of the magnetic flux provided through the loop of the DC SQUID within each qubit 102.

A qubit 102 may be constructed as an LC circuit, where L corresponds to the Josephson inductance of the Josephson junction of the qubit 102. It is well known that the resonance frequency of an LC circuit is given by $$f = \frac{1}{2\pi\sqrt{LC}}$$

Therefore, the resonance frequency, or the transition frequency of a qubit may be expressed as a function of the magnetic flux through the DC SQUID as $$f_{Qubit}(\varphi) = f_{max}\sqrt{\cos\left(\frac{\pi\varphi}{\varphi_0}\right)}$$

$f_{max}$ represents the maximum resonance frequency of the qubit. The vertical axis 210 of the plot 200 represents a transition frequency of a qubit 102 normalized to $f_{max}$, therefore ranges from 0 to 1. For a typical transmon qubit, the qubit 102 may be designed such that $f_{max}$ may be a frequency from about 3 GHz to about 10 GHz. However, the qubit 102 may be designed such that $f_{max}$ is any other frequency. The horizontal axis 220 of the plot 200 represents $$\frac{\varphi}{\varphi_0},$$

the magnetic flux φ through a SQUID loop of the qubit 102 normalized to the magnetic flux quantum $\omega_0$. The horizontal axis 220 may contain a negative number, which represents the opposite direction of the magnetic flux with respect to the SQUID loop of the qubit 102. For brevity, in the rest of the application, only the positive numbers in the horizontal axis 220 will be considered, which means that only the magnitude of the magnetic flux varies, but the direction of the magnetic flux will not reverse. However, it is understood that the concept presented in this application encompasses varying the direction of the magnetic flux to achieve the desired effect.

A first point 201 represents a flux insensitive point. When magnetic flux φ is not actively provided to the qubit 102, the resonance frequency of the qubit 102 will remain around the first point 201. Around the first point 201, the resonance frequency of the qubit 102 around the first point 201 will be more robust to the fluctuation of the magnetic flux than other points in the curve 200. This is because the curve 200 is symmetric around the first point 201 and the rate of change of the resonance frequency with respect to the change of the magnetic flux is smallest. Therefore, the first point 201 may be relatively robust to the noise arising from spurious fluctuation of the magnetic flux from the environment.

The resonance frequencies of the qubits 102 may be shifted away from the flux insensitive point 201 for operation such as performing an algorithm or a calibration. This is partly because the qubits 102 are affected the most by the two-level system (TLS) defects which are present in amorphous dielectric oxide layers. The noise spectral density of the two-level system (TLS) may be centered at a frequency which is higher than those of the qubits 102 and may gradually decrease with frequency on both sides of the center frequency. Therefore, the effect of the two-level system (TLS) defects decreases as the resonance frequencies of the qubits 102 are lowered. In addition to the two-level system (TLS), there can be other undesired parasitic resonances. Therefore, for performing an algorithm or a calibration, magnetic flux φ may be provided such that the resonance frequencies of the qubits 102 are shifted away from the flux insensitive point 201. Also, for a given design of an array of qubits, there may be a range of the flux insensitive points of the qubits due to distribution in fabrication tolerances. Therefore, when all of the resonance frequencies of an array of qubits are not identical, shifting the resonance frequencies of the qubits as described in FIG. 2 may provide uniformity in frequency control.

The operations may take place when the resonance frequencies of the qubits 102 are within a range defined by a second point 202 and a third point 203. The second point 202 and the third point 203 may be reached by increasing the magnetic flux φ from the first point 201' on the horizontal axis 220 to the second point 202' and the third point 203' on the horizontal axis 220, respectively. The range between the second point 202 and the third point 203 may be referred to as an operation dynamic range 206.

During an algorithm or a calibration, often the ability to move between at least two frequencies may be required. Also, the resonance frequencies of the qubits 102 may be adjusted to control the degree of interaction between neighboring qubits. Therefore, the magnitude of the operation dynamic range 206 may be determined such that during performing an algorithm or a calibration, at least two different bands of resonance frequencies of the qubits 102 can be defined. For example, the operation dynamic range 206 of a transmon qubit may be from 4 to 7 GHz or 5 to 8 GHz, although an exact range may depend on the design of the qubits 102.

A fourth point 204 represents a point substantially far from the first point 201 and from the operation dynamic range 206 in frequency, substantially towards the half flux quantum point, corresponding to the resonance frequency near DC, namely 0 in the vertical axis 210. The fourth point 204 may be determined such that the qubit whose resonance frequency is at the fourth point 204 is substantially decoupled from the qubits whose resonance frequencies are within the operation dynamic range 206, between the second point 202 and the third point 203, even if the qubit at the fourth point 204 and the qubit within the operation dynamic range 206 are spatially in close proximity.

In some implementations, the exact position of the fourth point 204 in terms of the magnetic flux may depend on the degree of capacitive coupling between the qubits 102, namely the geometry of each qubit 102 and the arrangement of the qubits 102, in particular, the distance between two neighboring qubits 102. Any two qubits 102 may be regarded as substantially decoupled when the degree of coupling between the two qubits 102 are sufficiently small such that it does not significantly affect performing algorithm or calibration.

There can be a trade-off relationship between the extent of the operation dynamic range and the suppression of noise. The main source of noise may be the qubit control electronics 20, often at room temperature. A large fraction of this noise is attenuated at the first attenuator 31, in the intermediate stage 12 of the cryostat 10. The first attenuator 31 may be placed in the intermediate stage 12 because the power requirement of the Z control signals is such that an appropriate cooling power is provided only at the intermediate stage 12, but not at the final stage 11. The noise from the room temperature qubit control electronics 20 may be therefore dissipated at the first attenuator 31 and be thermalized. Then the spectrum of the noise may be assumed to be roughly white when it reaches the qubit chip 100.

Since the noise near the qubit chip 100 may be largely white in spectrum, the total amount of noise is directly related to the bandwidth of the Z control signals. In other words, the qubit control electronics 20 outputs a constant white noise level, and there is a constant noise level per unit flux to the qubit chip 100. A large operation dynamic range between the second point 202 and the third point 203 may allow a proportionally larger amount of noise. When a qubit is cooled through the critical temperature Tc under zero magnetic field, the resonance frequency is set at the first point 201, which is a flux insensitive point. Then in order to operate up to the third point 203, the end of the operating range 206, a current is required with a magnitude corresponding to an interval between the first point 201' and the third point 203' on the horizontal axis. If instead the qubit is cooled under a magnetic field such that the resonance frequency is set at begin at a point 205 within the operating range 206, less current is required to reach the frequency at the third point 203. This allows more attenuation of the fixed white noise level from the control electronics, which provides an enhanced signal-to-noise ratio.

If the qubit is cooled under a magnetic field such that the frequency is set at the point 205 within the operating range 206, there is a trade-off between the signal to noise ratio and the width of the operation dynamic range between the second point 202 and the third point 203. Therefore, to minimise the noise leading to decoherence of the qubits 102, the computation may be performed with the minimum possible operation dynamic range.

Since this noise is transmitted via the Z control line 22, the noise level may be mitigated if at least part of the flux bias to the qubits 102 can be provided independent of the Z control line 22. In other words, if the qubits 102 receive a global flux bias such that a fixed amount of magnetic flux can be applied through the SQUID loop of the qubits 102 without using the Z control line 22.

For example, a magnetic field may be generated around the qubit chip 100 such that all of the qubits 102 experience substantially uniform magnetic field. If this magnetic field is such that all of the qubits 102 are brought to the second point 202, or the third point 203, or any one point 205 within the operation dynamic range 206, the magnetic flux which should be applied via the Z control line for performing an algorithm or a calibration is reduced to the range between 202' to 203'. This is smaller than the magnetic flux from the first point 201' to the third point 203'. Therefore, if offset magnetic flux bias can be generated for all of the qubits 102 without using the Z control lines 22, the noise level may be reduced, which may lead to suppression of decoherence of the qubits 102 and improving the signal-to-noise ratio of the measurements of the state of the qubit.

Figure 3:
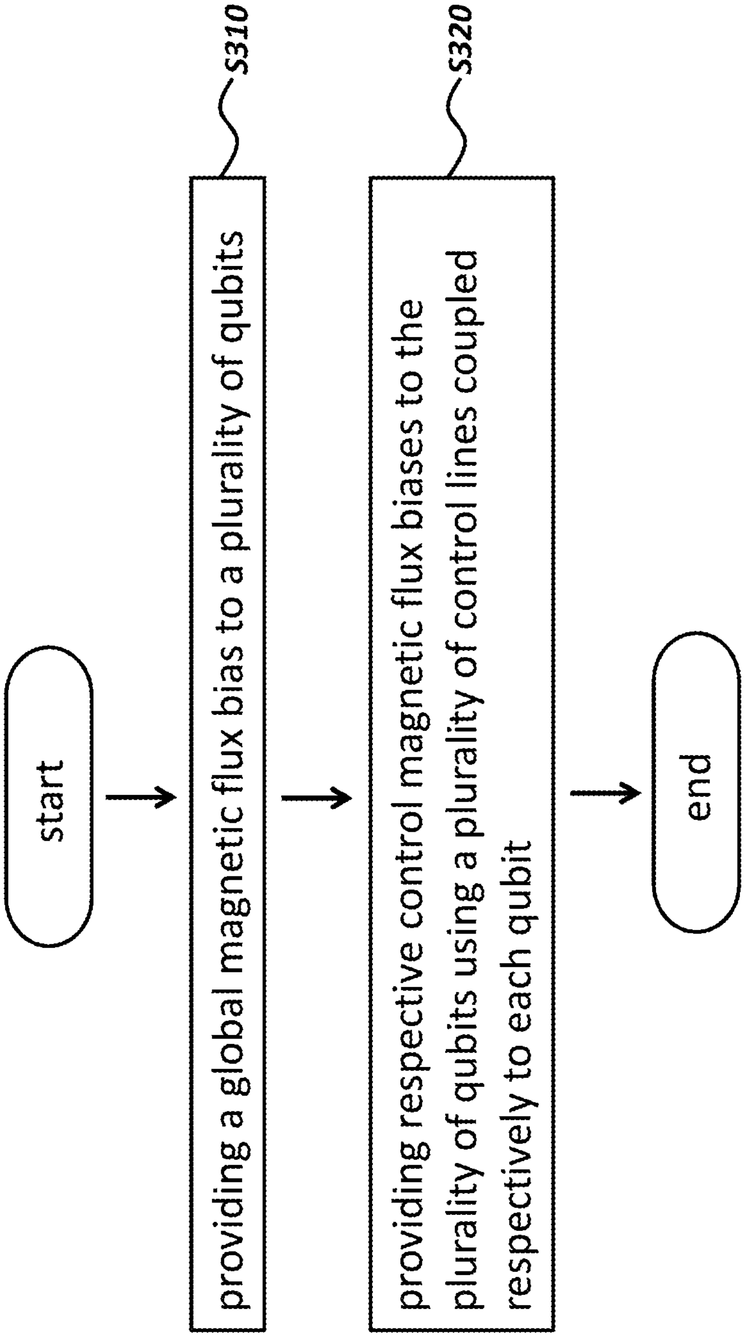
FIG. 3 is a flowchart of controlling transition frequencies of qubits using a global magnetic flux bias.

FIG. 3 shows a flowchart of controlling the transition frequencies of one or more of qubits 102 using a global magnetic flux bias, with reference FIGS. 1 and 2.

In step S310, a global magnetic flux bias, or an offset global magnetic flux bias, is provided to a plurality of qubits 102. The global magnetic flux bias or the offset magnetic flux bias correspond to the magnetic flux bias through the SQUID coil of the qubits 102 and shifts the resonance frequencies of the plurality of qubits 102. Once the offset magnetic flux bias is provided to the plurality of qubits 102, further adjustment of the transition frequencies of the individual qubits 102 may start from this offset value for performing an algorithm or an operation. For brevity of explaining the concept, it will be assumed in this application that the offset magnetic flux bias or the global magnetic flux bias is assumed to be substantially uniform for all of the qubits 102. However, depending on the method of generating the offset magnetic flux bias, any two of the qubits 102 may experience slightly different magnetic flux. How the offset magnetic flux bias is generated will be discussed in more detail later. As discussed in FIG. 2, the offset magnetic flux bias or the global magnetic flux, may be such that the qubits 102 are brought to the beginning of the operation dynamic range, the second point 202, or the end of the operation dynamic range, the third point 203, or any point 205 within the operation dynamic range.

In step 320, control magnetic flux biases are provided to the plurality of qubits 102 using individual Z control lines 22 connected to each qubit 102, to perform a computation, which may include performing a calibration or an algorithm. To perform any desired calibration or algorithm for computation, the movement of the transition frequencies will be performed with individual Z control lines 22 connected respectively to the qubits 102 while the offset magnetic flux bias is kept substantially at DC or within a small bandwidth, covering a speed relatively slower than the XY control signals. The XY control signals may be provided via the XY control lines 24. For the rest of the application, the magnetic flux bias applied to the qubits 102 via the Z control lines 22 will be referred to as control magnetic flux bias CZ and the offset magnetic flux bias affecting all of the qubits 102 will be referred to as the global magnetic flux bias GZ, to distinguish two different magnetic flux biases.

Figure 4A:
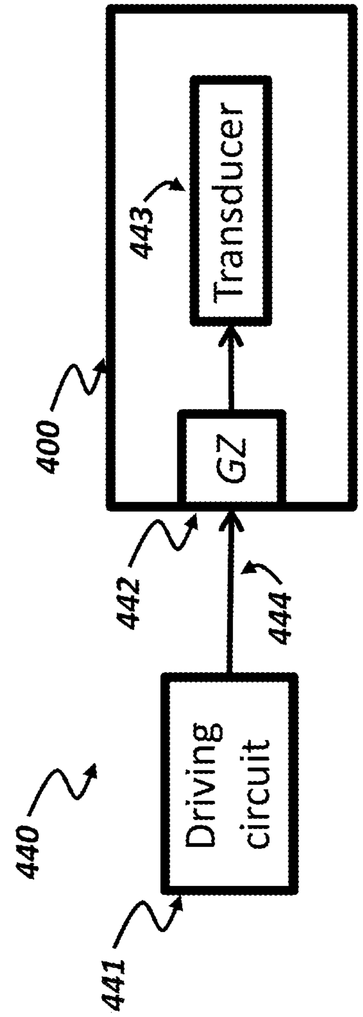
FIG. 4*a* is a schematic that illustrates an exemplary embodiment of a global magnetic flux generator.

FIG. 4*a* shows a schematic that illustrates an exemplary embodiment of an apparatus for providing an offset magnetic flux bias, or a global magnetic flux bias with references to FIG. 1. FIG. 4 shows the qubit chip 400 disposed in the final stage 13 of the cryostat. A global flux bias generator 440 may comprise a driving circuit 441, a global Z drive qubit circuit element 442 and a transducer 443. The driving circuit 441 may be included within the qubit control electronics 20. Alternatively, the driving circuit 441 may be a separate unit from the qubit control electronics 20. The driving circuit 441 may be disposed outside the cryostat 10 or in one of the stages, the initial stage 13, the intermediate stage 12, or the final stage 11. The driving circuit 441 may be arranged to provide a current or a voltage required for generating the global magnetic flux bias. The global Z drive qubit circuit element 442 may be included in the qubit chip 400, to the transducer 443 via the global Z drive qubit circuit element 442. The global Z drive qubit circuit element 442 may serve as an interface between the driving circuit 441 and the transducer 443. The driving circuit 441 and the global Z drive qubit circuit element 442 may be connected to each other via a driving line 444. The driving line 444, in the similar fashion as the data lines 22, 24, 26, may be disposed traversing one or more of the stages 11, 12, 13 of the cryostat 10. The global Z drive qubit circuit element 442 may be a connector which interfaces the driving line 444 and the qubit chip 400. The global Z drive circuit element 442 may include any other circuit elements such as a filter or a resonator which facilitates the operation of the transducer 443. The transducer 443 may convert the current or the voltage received from the driving circuit 441 into a magnetic field. The transducer 443 may be disposed on the qubit chip 400. Alternatively, the transducer 443 may be placed in the vicinity of the qubit chip 400 such that the magnetic field generated at the transducer 443 can be efficiently provided to the qubits 102. The example of the transducer 443 may include a coil or a loop into which the current generated by the driving circuit 441 is sent.

Figure 4B:
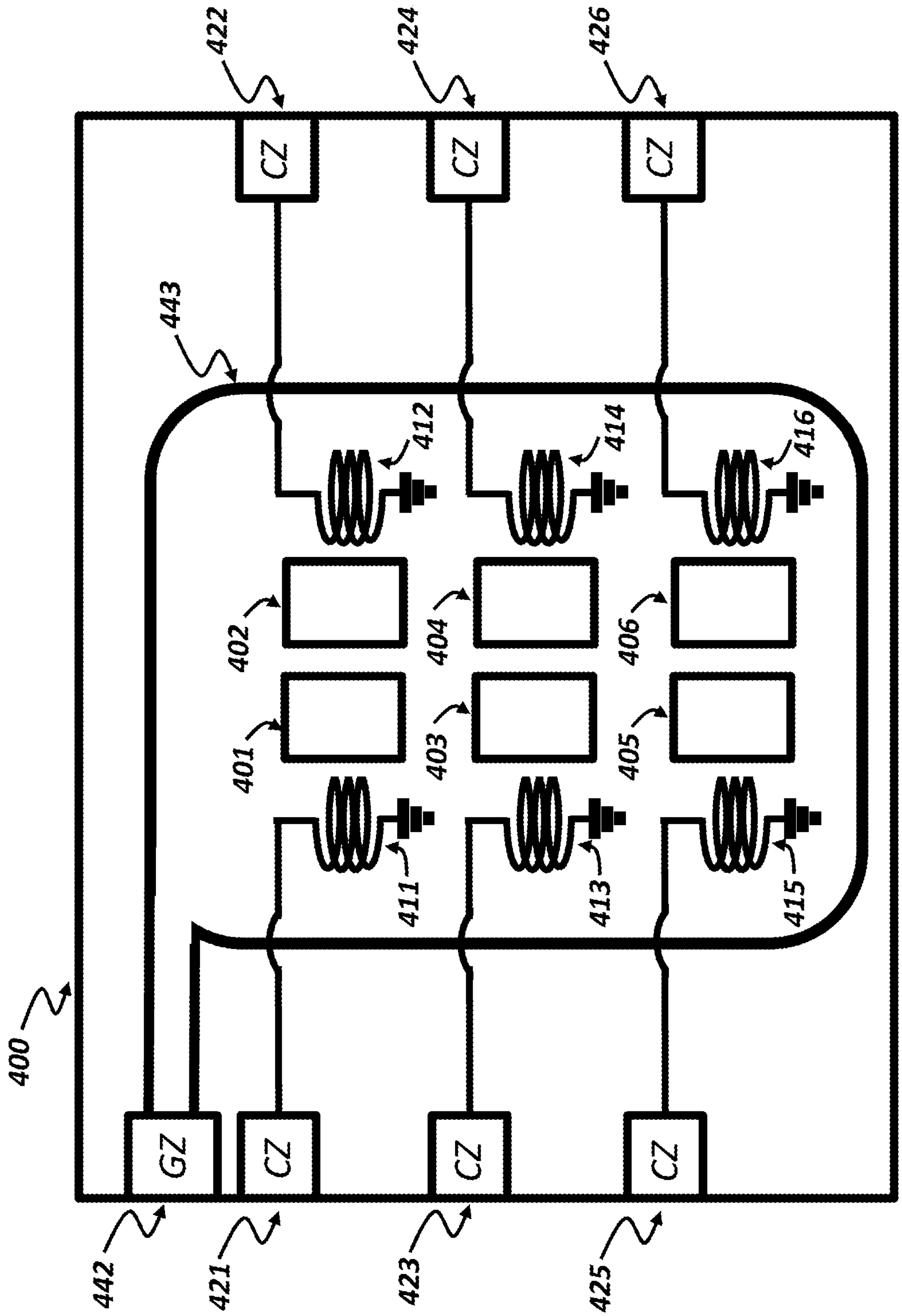
FIG. 4*b* is a schematic that illustrates an exemplary embodiment of a global magnetic flux generator on a qubit chip.

FIG. 4*b* shows a schematic that illustrates an exemplary embodiment of the global flux bias generator 440 on the qubit chip 400 with references to FIG. 1. The qubit chip 400 comprises a plurality of qubits 401, 402, 403, 404, 405, 406. In the example of FIG. 4, the qubit chip 400 includes six qubits 401, 402, 403, 404, 405, 406. However, this number of qubits is only exemplary and the number of qubits is not limited to six. The qubits 401, 402, 403, 404, 405, 406 may be connected to respective Z drive qubit circuit elements 421, 422, 423, 424, 425, 426 via respective inductive elements 411, 412, 413, 414, 415, 416. As explained above in FIG. 1, each qubit 401, 402, 403, 404, 405, 406 may also be connected to respective XY drive qubit circuit element 110 and respective qubit readout resonators 112 within the qubit chip 400. However, since this application mainly relates to providing the magnetic flux bias for Z control, FIG. 4*b* only depicts only the element directly relevant to Z control. The control magnetic flux bias CZ for each qubit 401, 402, 403, 404, 405, 406 may be provided by the qubit control electronics 20, which may be disposed outside the cryostat 10 or in the initial stage 13 or in the intermediate stage 12 of the cryostat 10.

In the example of FIG. 4*b*, the transducer 443 of the global magnetic flux bias generator 440 is disposed on the qubit chip 400 and in the form of a loop of conductor around the qubit chip 400, which encloses the qubits 401, 402, 403, 404, 405, 406. In the example of FIG. 4, the transducer 443 is formed as a part of the superconducting layer from which the qubits 401, 402, 403, 404, 405, 406 are formed. However, the arrangement of the transducer 443 is not limited to a loop on the surface of the qubit chip 400. The transducer 443 may assume any shape which is for efficient coupling of the magnetic flux to the qubits 401, 402, 403, 404, 405, 406. For example, the transducer 443 may be in the form of multiple loops. In some implementations, the transducer 443 may be fabricated within the same layer of the superconducting material as the qubits 401, 402, 403, 404, 405, 406 and the inductive elements 411, 412, 413, 414, 415, 416. Alternatively, the transducer 443 may be freestanding conducting wires wound around the qubit chip 400. Alternatively, the transducer 443 may be fabricated on the qubit chip 400 but from a different layer from the superconducting layer which includes the qubits 401, 402, 403, 404, 405, 406. Alternatively, the transducer 443 may be disposed on a front surface of a separate chip which may be brought into the proximity of the qubits 401, 402, 403, 404, 405, 406. For example, the separate chip may have a loop of conducting material as the transducer 443 and may be placed vertically over the qubits 401, 402, 403, 404, 405, 406.

The transducer 443 may be arranged to generate global magnetic flux bias GZ which reaches all of the qubits 401, 402, 403, 404, 405, 406 within the qubit chip 400. This may be achieved, for example, by running a current through the loop of conducting material of the transducer 443. However, any other suitable means to generate magnetic flux may be employed and the transducer 443 is not limited to a conducting loop. In some implementations, the distribution of the global magnetic flux bias GZ generated by the transducer 443 is such that all of the qubits 401, 402, 403, 404, 405, 406 experience substantially the same amount of the magnetic flux. In some implementations, the transducer 443 may generate global magnetic flux bias GZ whose direction is substantially perpendicular to the surface of the qubit chip 400 such that it couples efficiently to the SQUID loop of the qubits 401, 402, 403, 404, 405, 406. However, this may depend on the design of the qubits 401, 402, 403, 404, 405, 406. Therefore, as long as the global magnetic flux bias GZ generated by the global magnetic flux generator 430 is coupled efficiently to the qubits 401, 402, 403, 404, 405, 406, the direction of the global magnetic flux bias GZ may deviate from perpendicular to the qubit chip 400.

In some implementations, there may be more than one transducer 443 such that the qubits 401, 402, 403, 404, 405, 406 are grouped into more than one group of qubits 401, 402, 403, 404, 405, 406 and each group experiences a distinct magnetic flux.

In order to reduce thermal noise, the currents to generate the control magnetic flux bias CZ may be attenuated at the intermediate stage 12 with attenuators. This may place a significant heat load on the cryostat 10 as the number of qubits 401, 402, 403, 404, 405, 406 increases because the number of Z drive qubit circuit elements 421, 422, 423, 424, 425, 426 also increases. If the global magnetic flux generator 440 is employed, the current level to generate the control magnetic flux bias CZ for each qubit 401, 402, 403, 404, 405, 406 may be reduced.

In case the global magnetic flux bias GZ is generated by running a current through a conducting part of the transducer 443, the global Z drive qubit circuit element 442 or the driving circuit 441 may include a low pass filter with a narrow bandwidth such that the global magnetic flux bias GZ is substantially at DC and does not cause any fluctuation of the resonance frequencies of the qubits 401, 402, 403, 404, 405, 406 which may lead to decoherence. The bandwidth of the low pass filter may be determined based on the required noise level of the global magnetic flux bias GZ. Alternatively, the bandwidth of the low pass filter may be determined based on the frequency at which the resonance frequency of each qubit is shifted for performing a calculation or a calibration.

In case the global magnetic flux bias GZ is generated by running a current through a conducting part of the transducer 443, the degree of thermal dissipation may be kept within the cooling power of the final stage 13 of the cryostat 10.

As the number of qubits 401, 402, 403, 404, 405, 406 increases, the area to be enclosed by the transducer 443 may increase, which may require a higher level of currents to be constantly supplied throughout the operation. This may cause heating of the final stage 13 of the cryostat 10. This issue of thermal dissipation may be addressed if an alternative method of generating the global magnetic flux bias GZ is followed as described below and in FIG. 5.

Figure 5:
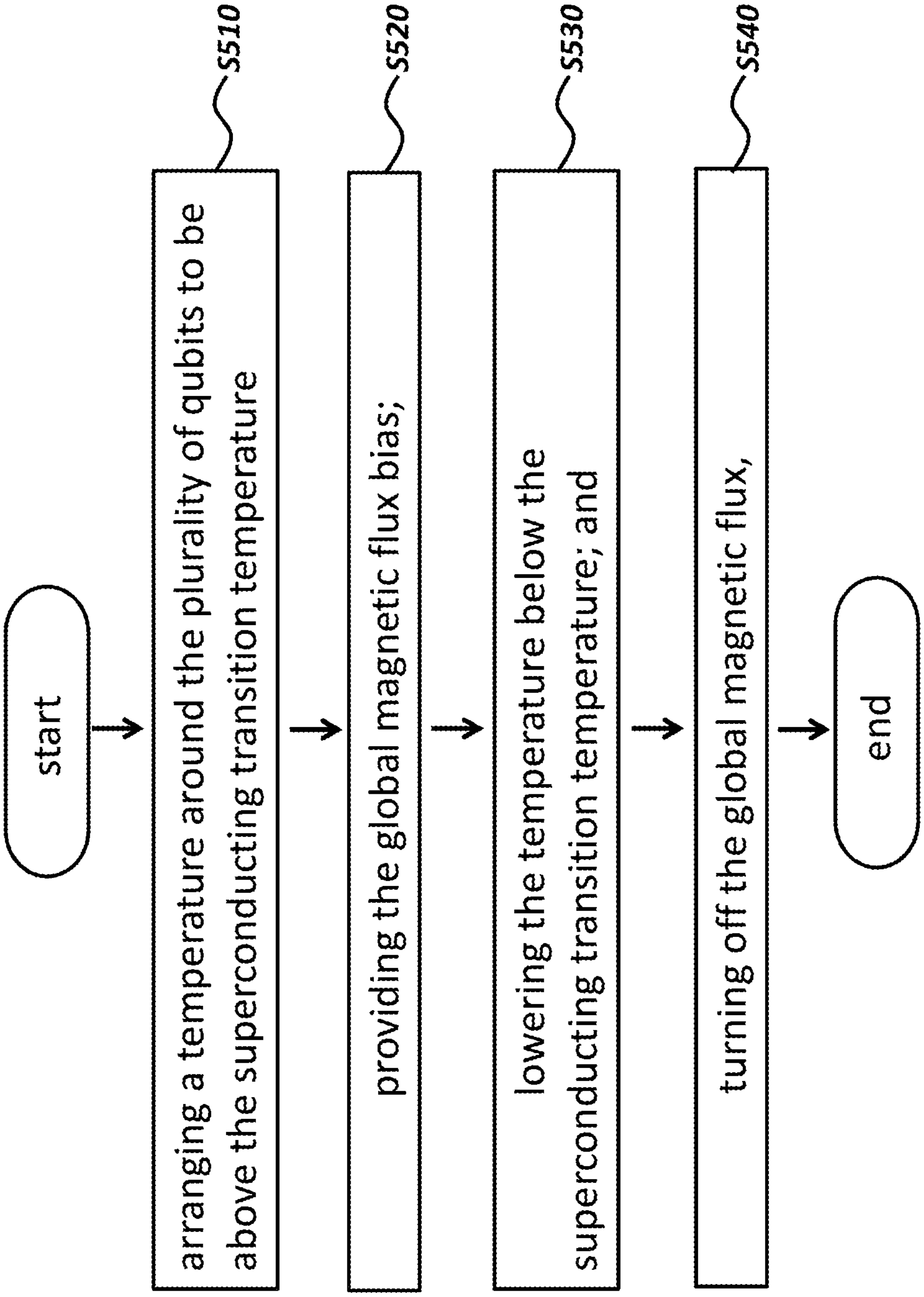
FIG. 5 is a flowchart of generating the global magnetic flux bias using a global magnetic flux generator.

FIG. 5 shows a flowchart of generating the global magnetic flux bias GZ using the global magnetic flux generator 440, with references to FIGS. 2, 4*a* and 4*b*.

In step S510, the temperature of the final stage 13 of the cryostat 10 may be arranged such that the temperature is above the superconducting transition temperature of the material used in fabricating the qubits 401, 402, 403, 404, 405, 406. Above the superconducting transition temperature, the qubits 401, 402, 403, 404, 405, 406 lose coherence and do not function as a quantum mechanical 2-level system. All of the circuit elements fabricated within the same plane as the qubits 401, 402, 403, 404, 405, 406 such as the inductive elements 411, 412, 413, 414, 415, 416 become lossy above the superconducting transition temperature.

In step S520, the global magnetic flux bias GZ may be provided. As discussed above in FIGS. 4*a* and 4*b*, this may be achieved by transmitting signal from the driving circuit 441 to the global Z drive qubit circuit element 442, then to the transducer 443. The driving circuit 441 may provide necessary level of current to the conducting part of the transducer 443, for example, a coil around the qubit chip 400. The driving circuit 441 may provide necessary level of voltage to the conducting part of the transducer 443, via the global Z drive qubit circuit element 442. In case the transducer 443 is a coil, the global Z drive qubit circuit element 442 may be arranged to generate the necessary level of current. The necessary level of current, therefore the global magnetic flux bias GZ, may be determined such that once the temperature of the final stage 13 is cooled down below the transition temperature, the resonance frequencies of the qubits 401, 402, 403, 404, 405, 406 are brought to the point 205 between the second point 202 and the third point 203 of FIG. 2, namely within the operation dynamic range 206.

In some implementations, the transducer 443 may be fabricated within the superconducting layer on which the qubits 401, 402, 403, 404, 405, 406 are fabricated, the transducer 443 above the superconducting transition temperature will exhibit a finite level of dissipation because the temperature has been elevated above the transition temperature in step S510. The current level may be determined taking into consideration of the finite dissipation. In some implementations, the transducer 443 may be a separate element from the superconducting layer of the qubits, 401, 402, 403, 404, 405, 406, for example, an external coil. The current level may be determined taking into consideration of the finite dissipation of the material of the transducer 443 at the elevated temperature. The material of the transducer 443 separate from the qubit chip 100 may be chosen to be a material which becomes superconducting at the elevated temperature of step S510.

In step S530, the temperature of the final stage 13 may be lowered below the superconducting transition temperature, while the global magnetic flux bias GZ provided in step S520 is maintained. As well-known as the Meissner effect, a superconductor expels magnetic field during the transition, thereby cancelling all of the magnetic field within the body of the superconductor. Therefore, during the superconducting transition as the temperature of the final stage 13 lowers, each qubit 401, 402, 403, 404, 405, 406 comprising a superconductor material, will generate a so-called persistent current internally to cancel the magnetic field distribution within itself formed by the global magnetic flux bias GZ provided in step S520. It is well known that the decay of the persistent current in time is negligible as long as the temperature is kept below the superconducting transition temperature.

In step S540, the global magnetic flux bias GZ may be turned off after the temperature of the final stage 13 is lowered below the superconducting transition temperature of the superconducting material of the qubits 401, 402, 403, 404, 405, 406. Also as discussed above in FIGS. 4*a* and 4*b*, this may be achieved by interrupting the current or the voltage signal from the driving circuit 441 to the transducer 443. Due to the persistent current, even after the global magnetic flux bias GZ is turned off, the global magnetic flux bias GZ is provided as long as the temperature of the final state 13 is kept lower than the superconducting transition temperature. Since it is equal in magnitude of the global magnetic flux bias GZ, as soon as the global magnetic flux bias GZ is turned off, the qubits 401, 402, 403, 404, 405, 406 are brought to the point 205 between the second point 202 and the third point 203 of FIG. 2 within the operation dynamic range.

Generating the global magnetic flux bias GZ as described above and in FIG. 5 does not require the current through the transducer 443 constantly on. Therefore, the issue of heating of the intermediate stage 12 or the final stage 13 of the cryostat 10 may be mitigated. Also, since the global magnetic flux bias GZ is conserved within the superconducting material of the qubits 401, 402, 403, 404, 405, 406, the magnitude of the global magnetic flux bias GZ stays inherently stable. Therefore, a low pass filter with small bandwidth may not be necessary to minimize the noise level of the global magnetic flux bias GZ.

In some implementations, the global magnetic flux bias GZ may also be used to isolate one or more faulty qubits 401, 402, 403, 404, 405, 406 from the others. The failure of the qubit may originate from the qubit itself, or one or more of the circuit elements, 106, 110, 112, 421, 422, 423, 424, 425, 426, 440 or any point within the control lines 22, 24, 26 connected to the qubit such that the qubit 401, 402, 403, 404, 405, 406.

Each Z control line 22 may be faulty at various failure points such as faulty cabling, loosened connectors, errors in PCB packaging, wirebonds and lithography such as the qubit Z control line 22, the first attenuator 31, the Z drive qubit circuit element 106, 421, 422, 423, 424, 425, 426. Especially, when the failure of the qubit relates to Z control, the resonance frequencies of the qubits 401, 402, 403, 404, 405, 406 are not controllable. In this case, the faulty qubit may remain coupled to the neighboring qubits.

Figure 6A:
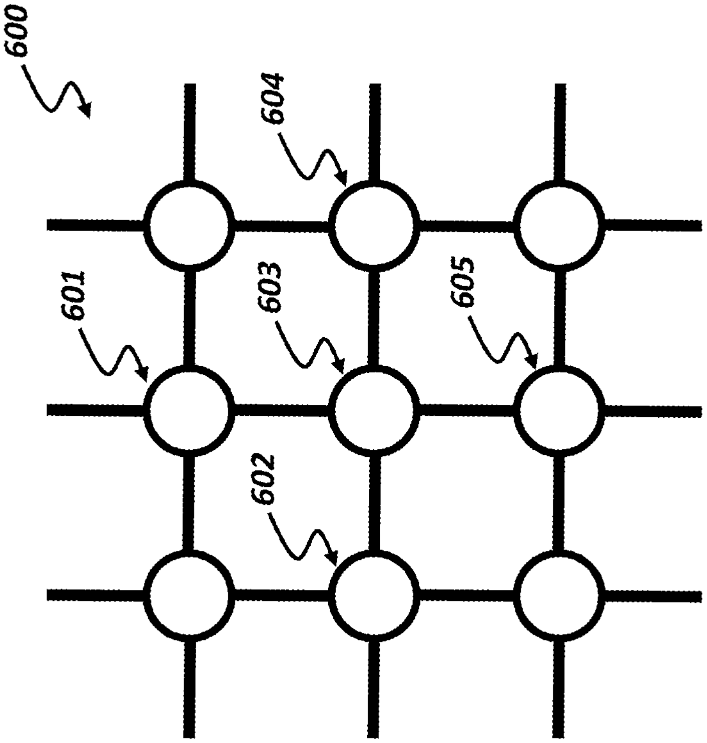
FIG. 6*a* is a schematic that illustrates a 2-dimensional array of qubits.

FIG. 6*a* shows a schematic which illustrates qubits arranged in a 2-dimensional array with references to FIG. 2. FIG. 6 shows a 2-dimensional grid 600 of 9 qubits, each represented by a circle, which belong to a 2-dimensional array which contains more than 9 qubits. The lines of FIG. 6*a* represent the coupling relations among the qubits 601, 602, 603, 604, 605, namely that the two qubits on either side of each line are coupled to each other. The lines do not correspond to any of the control or data lines 22, 24, 26.

In some implementations, any two qubits may be coupled to each other capacitively. Alternatively, any two qubits may be coupled to each other via any other mechanism than capacitive coupling, which will facilitate entangling the two qubits. In case the qubits are coupled to each other capacitively, the shape of each qubit 601, 602, 603, 604, 605 may be arranged such that the neighbouring qubits are coupled to one another capacitively due to proximity between conducting parts of the two qubits. For example, the shape of each qubit 601, 602, 603, 604, 605 may be cross-shaped such that only the nearest qubits are directly coupled and the degree of coupling between next nearest qubits are negligible for the scheme of computation.

In some implementations, once the qubits 601, 602, 603, 604, 605 are arranged in the 2-dimensional grid 600, the degree of capacitive coupling between any two qubits are determined by the shape of each qubit 601, 602, 603, 604, 605 and the distance between them. The degree of coupling between any two qubits 601, 602, 603, 604, 605 may be further controlled by the resonance frequencies via the Z control signals to the qubits 601, 602, 603, 604, 605.

Figure 6B:
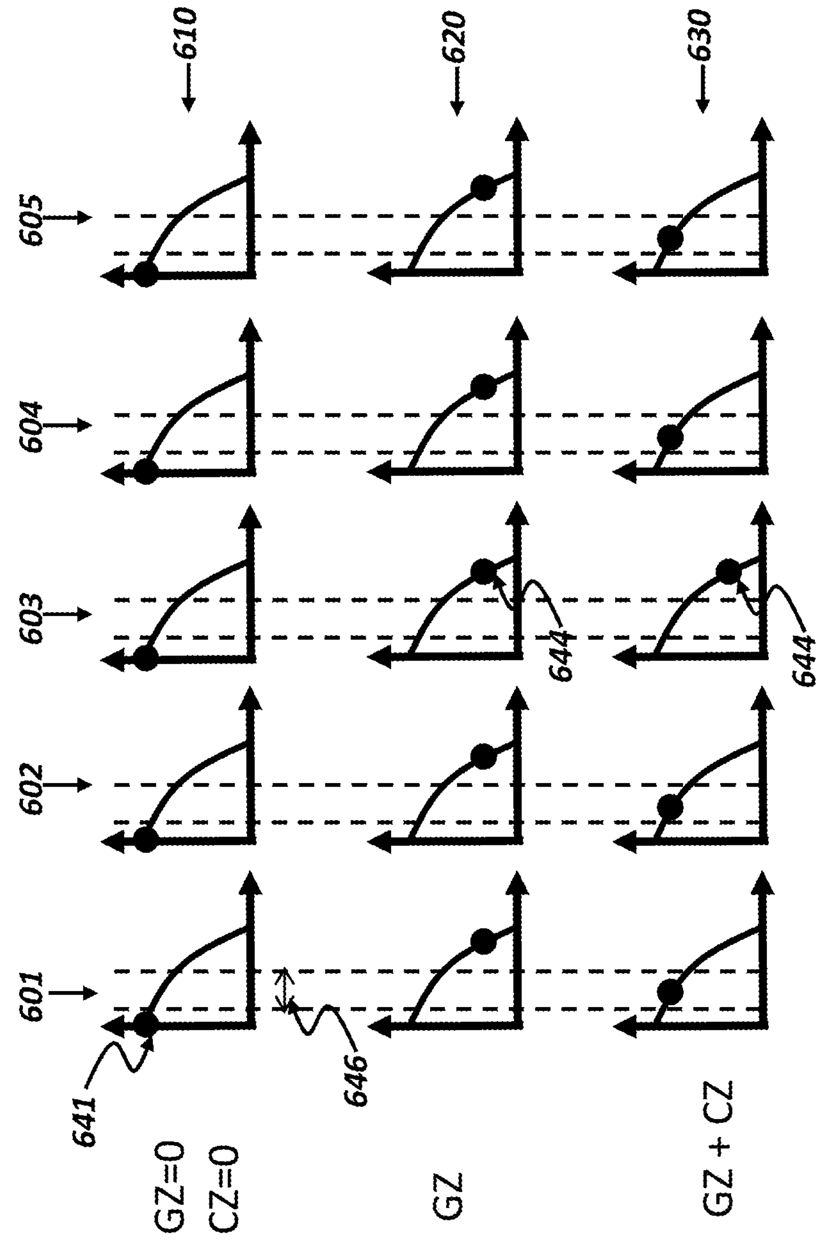
FIG. 6*b* is a schematic diagram that illustrates a procedure of selectively decoupling a faulty qubit from a 2-dimensional array of qubits.

In the example of FIGS. 6*a* and 6*b*, it will be assumed that only the neighboring qubits are coupled to one another and the degree of coupling between next nearest qubits will be assumed to be negligible for the scheme of computation. In the example of FIGS. 6*a* and 6*b*, the qubit 603 will be assumed to be faulty, in other words, unusable for the computation because the resonance frequency of the qubit 603 is not controllable by control magnetic flux bias CZ provided by the Z control line 22 attached to the qubit 603.

As discussed above, the faulty qubit 603 may arise due to the failure of the qubit Z control line 22, the first attenuator 31, or the Z drive qubit circuit element 106, 421, 422, 423, 424, 425, 426. Each Z control line 22 may be faulty at various failure points such as faulty cabling, loosened connectors, errors in PCB packaging, wirebonds and lithography.

Since the resonance frequency of the faulty qubit 603 is not controllable, the resonance frequency of the faulty qubit 603 will stay in the first point 201, the flux insensitive point. When the resonance frequencies of the coupled qubits 601, 602, 604, 605 are brought within the operation dynamic range 206, and therefore away from the flux insensitive point 201, there may still exist a degree of coupling and this may persist. This residual coupling with the faulty qubit 603 may render the neighboring qubits 601, 602, 604, 605 unusable for the purpose of the computation. Therefore, one faulty qubit 603 may lead to exclusion of the qubit 603 itself and all of the coupled qubits 601, 602, 604, 605, in total five qubits, from contributing to the computation, in case of 2-dimensional grid geometry of qubits.

This issue may be addressed if the faulty qubit 603 could be selectively decoupled from the neighboring qubits 601, 602, 604, 605. Then only the faulty qubit 603 itself can be excluded from the operation, the neighboring qubits 601, 602, 604, 605 may still take part in the operation. This may be achieved by bringing only the faulty qubit 603 to the fourth point 204, such that the interaction with the qubits 601, 602, 604, 605 within the dynamic range can be regarded as substantially negligible or turned off. This will be explained in more detail below and in FIG. 6*b*.

FIG. 6*b* shows a schematic diagram which shows the procedure of selectively decoupling the faulty qubit 603 from the 2-dimensional grid of qubits 601, 602, 603, 604, 605.

Each graph corresponds to the plot 200 provided in FIG. 2 with the horizontal axis representing the magnetic flux and with the vertical axis representing the resonance frequency of the qubit 601, 602, 603, 604, 605. Three panels a first panel 610, a second panel 620, and a third panel 630, each comprising five graphs for the qubits 601, 602, 603, 604, 605 represents different conditions for Z magnetic flux bias applied to the qubits 601, 602, 603, 604, 605. In particular, the magnetic flux in this example is proportional to the combination, for example a vector sum, of the control magnetic flux bias CZ and the global magnetic flux bias GZ.

The operation dynamic range 646 is represented by the two dotted lines in all of the graphs of FIG. 6*b*. The operation dynamic range 646 of FIG. 6*b* corresponds to the operation dynamic range 206 explained in FIG. 2. The beginning point and the ending point of the operation dynamic range 646 corresponds to the second point 202 and the third point 203 explained in FIG. 2. The first point 641 in all of the graphs of FIG. 6*b* corresponds to the first point 201 explained in FIG. 2. The fourth point 644, as indicated in the graphs for the qubit 603 in a second panel 620 and a third panel 630 corresponds to the fourth point 204 explained in FIG. 2.

The first panel 610 shows five plots, representing the states of the qubits 601, 602, 603, 604, 605 when neither the control magnetic flux bias CZ nor the global magnetic flux bias GZ is provided. As explained in FIG. 2, all of qubits 601, 602, 603, 604, 605 remain at the first point 641, the flux insensitive point.

The second panel 620 shows five plots representing the states of the qubits 601, 602, 603, 604, 605 when only the global magnetic flux bias GZ is provided. The global magnetic flux bias GZ is set such that all of the qubits 601, 602, 603, 604, 605 are moved to the fourth point 644. As discussed in FIG. 2 above, the fourth point 644 is far removed from the operation dynamic range 646 such that any qubit whose frequency is at the fourth point 644 is decoupled from the qubits whose frequencies are within the dynamic range 646.

The third panel 630 shows five plots representing the states of the qubits 601, 602, 603, 604, 605 when the control magnetic flux bias CZ is provided for the neighboring qubits 601, 602, 604, 605 such that the combination of the global magnetic flux bias GZ and the control magnetic flux bias CZ brings the neighboring qubits 601, 602, 604, 605 to the operational dynamic range 646. In this case, the faulty qubit 603 is decoupled from the neighboring qubits 601, 602, 604, 605.

Therefore, by using the control magnetic flux bias CZ and the global magnetic flux bias GZ, only the faulty qubit 603 can be isolated from the network of qubits 601, 602, 603, 604, 605 and the qubits 601, 602, 604, 605 directly coupled to the faulty qubit 603 can be made to take part in the computation.

The method described in FIG. 6*b* may be employed if the all of the qubits 601, 602, 603, 604, 605 in a given area of the 2-dimensional grid 600 take part in the calculation either as data qubits or as ancillary qubits, and none of the qubits 601, 602, 603, 604, 605 are used as tunable couplers.

The 2-dimensional grid 600 of qubits 601, 602, 603, 604, 605 as shown in FIG. 6*a*, is merely an example of the arrangement of the qubits 601, 602, 603, 604, 605. Any other geometry of arrange the qubits 601, 602, 603, 604, 605 may be possible. For example, a honeycomb geometry in 2-dimensional array or a 3-dimensional array of qubits may be possible. The general concept of the selective exclusion of faulty qubit using global magnetic flux bias GZ applies to any geometry of qubit arrays.

Figure 7:
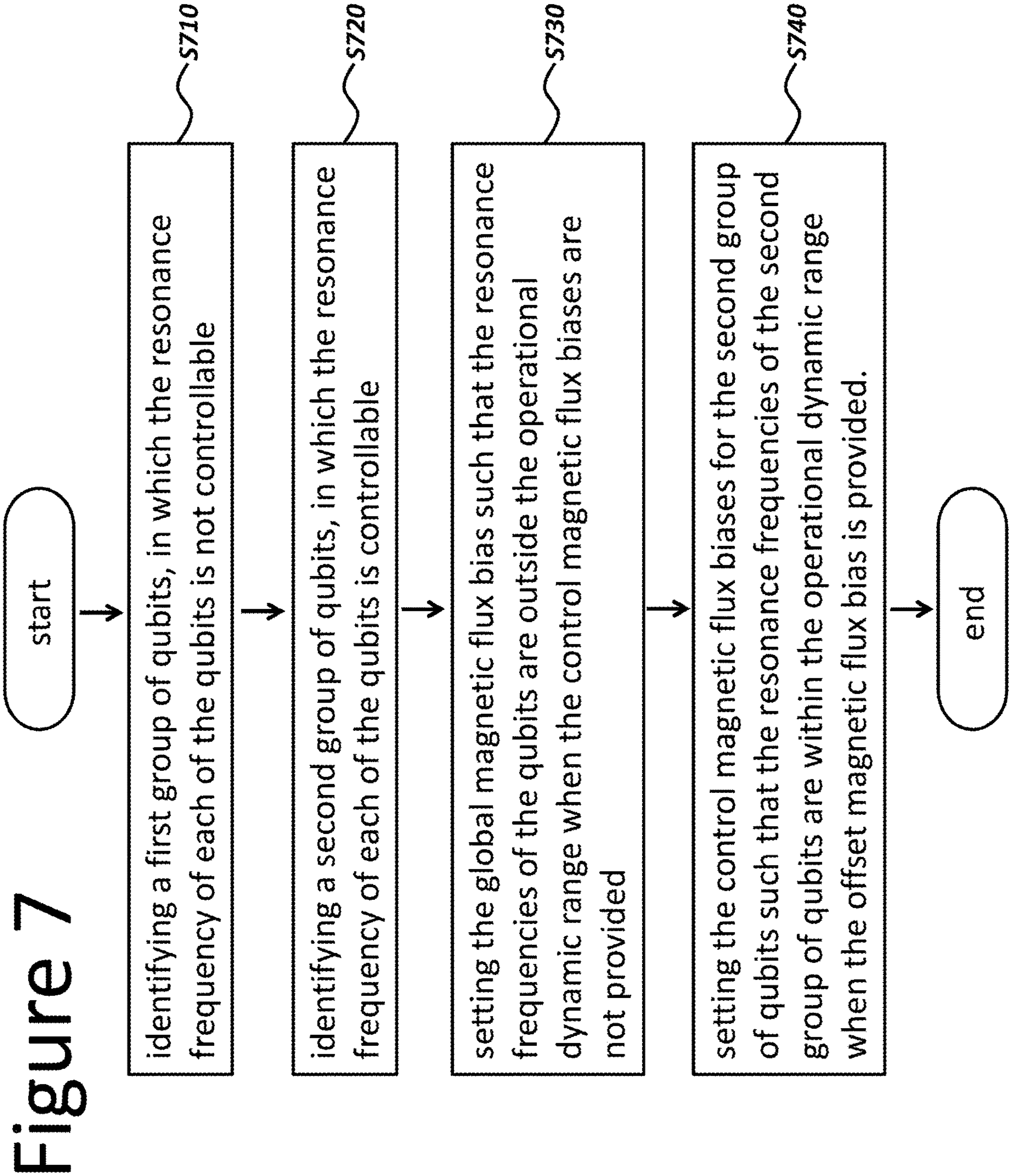
FIG. 7 is a flowchart of isolating faulty qubits within a network of coupled qubits.

FIG. 7 shows a flowchart which illustrates the procedure for isolating the faulty qubit 603 within the network of coupled qubits 601, 602, 603, 604, 605 with references to FIGS. 2, 6*a* and 6*b*.

In step S710, a first group of qubits are identified whose resonance frequencies are not controllable. As discussed above, the fault can reside at any point from the qubit control electronics 20 and the qubits 601, 602, 603, 604, 605 such that the resonance frequency of the qubits 601, 602, 603, 604, 605 cannot be controlled with the qubit control magnetic flux bias CZ. Also, any of the qubits 601, 602, 603, 604, 605 themselves may not be operable due to defects arising from fabrication process. In the example of FIGS. 6*a* and 6*b*, the first group of qubits corresponds to the faulty qubit 603.

In step S720, a second group of qubits are identified which will be used for computation. The second group of qubits may be all of the rest of the available qubits excluding the first group of qubits identified in step S710. Alternatively, the second group of qubits may not be all of the rest of the available qubits depending on the algorithm or the calibration to be performed modified in view of the first group of qubits. In the example of FIGS. 6*a* and 6*b*, the second group of qubits corresponds to the neighboring qubits 601, 602, 604, 605.

In step S730, the global magnetic flux bias GZ may be set such that the resonance frequencies of all of the qubits 601, 602, 603, 604, 605 are outside the operational dynamic range 646 and at the fourth point 644. This is as shown in the second panel 620 of FIG. 6*b*.

In step S740, the control magnetic flux biases CZ of the second group of qubits may be set such that the resonance frequencies of the second group of qubits are brought into the operational dynamic range 206. This is as shown in the third panel 630 of FIG. 6*b*.

Implementations of the quantum subject matter and quantum operations described in this specification can be implemented in suitable quantum circuitry or, more generally, quantum computational systems, also referred to as quantum information processing systems, including the structures disclosed in this specification and their structural equivalents, or in combinations of one or more of them. The terms "quantum computational systems" and "quantum information processing systems" may include, but are not limited to, quantum computers, quantum cryptography systems, topological quantum computers, or quantum simulators.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In some implementations the computational basis states are identified with the ground and first excited states, however it is understood that other setups where the computational states are identified with higher level excited states are possible. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

Fabrication of the quantum circuit elements and classical circuit elements described herein can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of about 1.2 kelvin), indium (superconducting critical temperature of about 3.4 kelvin), NbTi (superconducting critical temperature of about 10 kelvin) and niobium (superconducting critical temperature of about 9.3 kelvin). Accordingly, superconducting structures, such as superconducting traces and superconducting ground planes, are formed from material that exhibits superconducting properties at or below a superconducting critical temperature.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the actions recited in the claims can be performed in a different order and still achieve desirable results. In certain circumstances, multitasking and parallel processing may be advantageous. Moreover, the separation of various components in the implementations described above should not be understood as requiring such separation in all implementations.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:

simultaneously providing an offset magnetic flux bias to a plurality of superconducting qubits, wherein providing the offset magnetic flux bias comprises providing a global magnetic field, and wherein a magnitude of the global magnetic field is substantially uniform to the plurality of qubits; and additionally providing respective control magnetic flux biases, for performing a computation, to the plurality of qubits using a plurality of control lines coupled respectively to each qubit, wherein the qubits are configured such that respective resonance frequencies of the qubits are controlled by the offset magnetic flux bias and the respective control magnetic flux biases, and wherein the qubits are arranged to perform the computation when the respective resonance frequencies of the qubits are within an operational dynamic range; and identifying a first group of qubits, in which the resonance frequency of each of the qubits is not controllable; and identifying a second group of qubits, in which the resonance frequency of each of the qubits is controllable, wherein providing the offset magnetic flux bias comprises:

setting the offset magnetic flux bias such that the resonance frequencies of the qubits of the first group of qubits and the second group of qubits are outside the operational dynamic range when the control magnetic flux biases are not provided, and wherein providing the control magnetic flux biases further comprises:

setting the control magnetic flux biases for the second group of qubits such that the resonance frequencies of the second group of qubits are within the operational dynamic range when the offset magnetic flux bias is provided.

2. The method of claim 1, wherein providing the offset magnetic flux bias comprises setting the resonance frequencies of al of the qubits at a frequency within the operational dynamic range.

3. The method of claim 1, wherein the global magnetic field is generated by driving a current through a coil, and wherein the coil is arranged such that the magnitude of the global magnetic field is substantially uniform to the plurality of qubits.

4. The method of claim 3, wherein the coil is wound around the plurality of qubits such that the plurality of qubits are exposed to the global magnetic field through an axis of the coil.

5. The method of claim 3, wherein the coil is disposed on a substrate on which the plurality of qubits are disposed.

6. The method of claim 1, wherein the operational dynamic range comprises one or more frequency ranges which fall between 4 GHz and 6 GHz.

7. The method of claim 1, wherein each of the plurality of qubits comprises a DC SQUID.

8. The method of claim 7, wherein each of the plurality of qubits further comprises a parallel LC circuit, wherein an inductor of the parallel LC circuit comprises the DC SQUID, and wherein an inductance of the DC SQUID is determined by the offset flux bias and the control flux bias provided to the qubit.

9. The method of claim 1, wherein an operation bandwidth of the offset magnetic flux is below 10 Hz, an operation bandwidth of a control magnetic flux bias is 300 to 700 MHz.

10. The method of claim 1, wherein providing the offset magnetic flux bias comprises, in the following sequence:

arranging a temperature around the plurality of qubits to be above a superconducting transition temperature;

providing the global magnetic field;

lowering the temperature below the superconducting transition temperature; and turning off the global magnetic field, such that the offset magnetic flux bias is conserved within all of the plurality of qubits after turning off the global magnetic field.

11. A method comprising:

simultaneously providing an offset magnetic flux bias to a plurality of superconducting qubits, wherein providing the offset magnetic flux bias comprises providing a global magnetic field, and wherein a magnitude of the global magnetic field is substantially uniform to the plurality of qubits; and additionally providing respective control magnetic flux biases, for performing a computation, to the plurality of qubits using a plurality of control lines coupled respectively to each qubit wherein the qubits are configured such that respective resonance frequencies of the qubits are controlled by the offset magnetic flux bias and the respective control magnetic flux biases, and wherein the qubits are arranged to perform the computation when the respective resonance frequencies of the qubits are within an operational dynamic range; and wherein providing the offset magnetic flux bias comprises, in the following sequence:

arranging a temperature around the plurality of qubits to be above a superconducting transition temperature;

providing the global magnetic field;

lowering the temperature below the superconducting transition temperature; and turning off the global magnetic field, such that the offset magnetic flux bias is conserved within all of the plurality of qubits after turning off the global magnetic field.

12. An apparatus for providing an offset magnetic flux bias for a plurality of superconducting qubits, the apparatus comprising:

an offset magnetic flux bias generator arranged to generate an offset magnetic flux bias and apply the offset magnetic flux bias simultaneously to the plurality of qubits, wherein the offset magnetic flux bias comprises a global magnetic field that is substantially uniform for the plurality of qubits; and qubit control electronics configured to provide a separate control magnetic flux bias to each qubit of the plurality of qubits for performing a computation, wherein the plurality of qubits are configured such that respective resonance frequencies of the qubits are controlled by the offset magnetic flux bias and the respective control magnetic flux biases, wherein the plurality of qubits are arranged to perform the computation when the respective resonance frequencies of the qubits are within an operational dynamic range;

wherein the qubit control electronics are configured to perform operations comprising:

identifying a first group of qubits, in which the resonance frequency of each of the qubits is not controllable;

identifying a second group of qubits, in which the resonance frequency of each of the qubits is controllable;

setting the control magnetic flux biases for the second group of qubits such that the resonance frequencies of the second group of qubits are within the operational dynamic range when the offset magnetic flux bias is provided; and setting the offset magnetic flux bias such that the resonance frequencies of the qubits of the first group of qubits and the second group of qubits are outside the operational dynamic range when the control magnetic flux biases are not provided.

13. The apparatus of claim 12, wherein the offset magnetic flux bias generator further comprises:

a driving circuit; and a transducer.

14. The apparatus of claim 13, wherein the transducer comprises:

a coil; and a plurality of control lines coupled respective to each qubit.

15. The apparatus of claim 14, wherein the driving circuit is arranged to drive the coil to provide the offset magnetic flux bias.

16. The apparatus of claim 14, wherein the coil is wound around the plurality of qubits, and wherein the coil is arranged to generate the global magnetic field.

17. The apparatus of claim 16, wherein the coil is wound around the plurality of qubits such that the plurality of qubits are exposed to the global magnetic field through an axis of the coil.

18. The apparatus of claim 14, wherein the coil is disposed on a substrate on which the plurality of qubits are disposed.

19. The apparatus of claim 14, wherein the driving circuit is arranged to drive the plurality of control lines to provide the offset magnetic flux bias.

* * * * *